United States Patent [19]
Weber et al.

[11] Patent Number: 5,173,102
[45] Date of Patent: Dec. 22, 1992

[54] APPARATUS FOR CURVING GLASS SHEETS

[75] Inventors: Frederic Weber, Compiegne; Claude Didelot, Thourotte, both of France

[73] Assignee: Saint-Gobain Vitrage International, Courbevoie, France

[21] Appl. No.: 656,846

[22] Filed: Feb. 19, 1991

[30] Foreign Application Priority Data

Feb. 21, 1990 [FR] France ................. 90 02090

[51] Int. Cl.$^5$ ........................................ C03B 23/023
[52] U.S. Cl. ........................................ 65/273; 65/162; 65/350
[58] Field of Search ............... 65/162, 273, 287, 349, 65/350, 106, 111, DIG. 4, 107

[56] References Cited

U.S. PATENT DOCUMENTS

| | | | |
|---|---|---|---|
| 2,794,300 | 6/1957 | Golightly | 65/273 |
| 2,967,378 | 1/1961 | Jones et al. | 65/287 |
| 3,001,328 | 9/1961 | Berseth | 65/273 |
| 4,601,743 | 7/1986 | Canfield | 65/162 |
| 4,824,464 | 4/1989 | Perin et al. | 65/350 |
| 4,952,227 | 8/1990 | Herrington et al. | 65/162 |
| 4,979,977 | 12/1990 | Frank et al. | 65/287 |

*Primary Examiner*—Joye L. Woodard
*Attorney, Agent, or Firm*—Oblon, Spivak, McClelland, Maier & Neustadt

[57] ABSTRACT

A curving furnace has at least one curving station, of which the walls are equipped with resistors. The series of upper resistors are subdivided into one or more axial zones in which the resistors are oriented parallel to the height of the glass sheets, and into one or more transverse zones in which the resistors are oriented perpendicularly. The heating power of a given zone is regulated independently of the heating powers associated with the other zones.

10 Claims, 3 Drawing Sheets

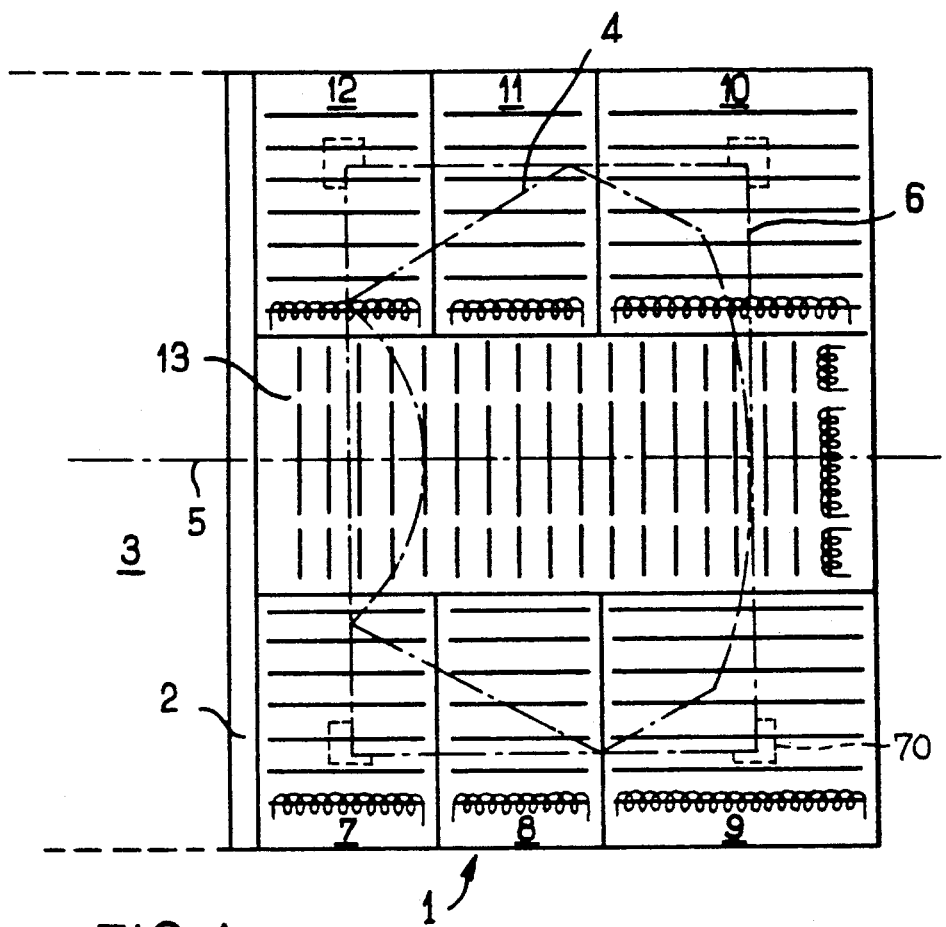
FIG_1
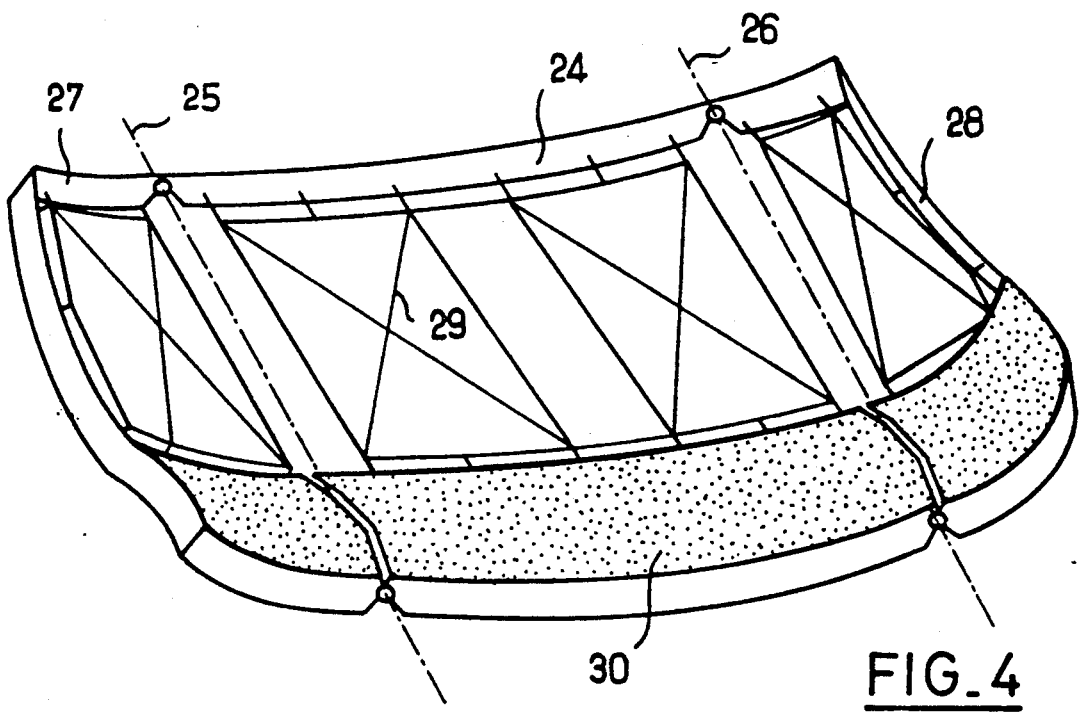
FIG_4

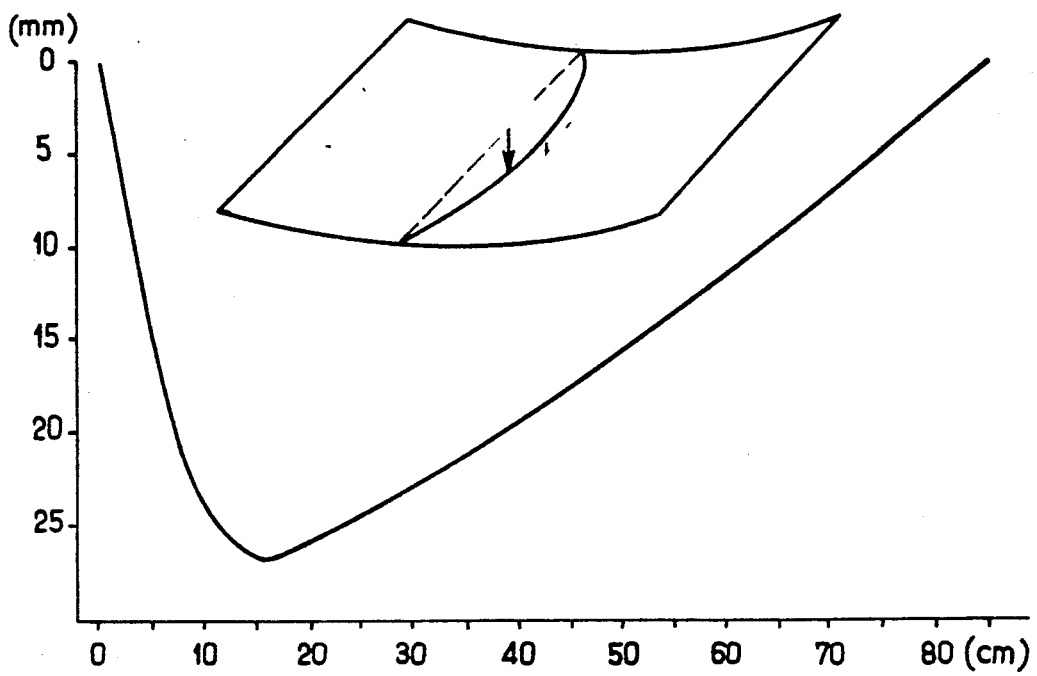
FIG_3a
FIG_3b

APPARATUS FOR CURVING GLASS SHEETS

BACKGROUND OF THE INVENTION

1. Field of the Invention

This invention relates to techniques for curving glass sheets by settlement or sinking onto a curving frame. It concerns, more specifically, an installation making possible very accurate control of the heating conditions of glass sheets for the purpose of complete mastery of the principal and secondary curvatures which it is desired to impart to the glass sheet. The invention is applicable, notably, to the production of laminated glazing intended for automobile vehicles.

2. Description of the Related Art

For curving pairs of glass sheets for the purpose of constructing laminated panes, it is usual to arrange the two glass sheets on a curving frame, also known as a skeleton, and to cause the frame to advance continuously or intermittently through a series of heating stations, in which the frame dwells for a greater or lesser time. In electrical furnaces, each of these heating stations is lined with resistors composed, for instance, of tubes of refractory ceramic around which electrical wires are wound. The tubes fitted to the hearth and vault of the furnace are mounted parallel to the furnace axis, whereas the panes are introduced perpendicularly to this axis; in this way it is very easy to provide additional heat to the lateral edges of the pane to which it is generally desired to impart a rather more pronounced curvature than that given to the central part of the pane. Moreover, an orientation of this type biases the optical quality in the sense that any optical defects generated by heating which is not rigorously uniform, but takes place along a series of bands corresponding to the resistor tubes, extend substantially vertically after the pane has been mounted in the vehicle and do not interfere at all with the view of the driver.

Methods of this class are well suited to the production of panes of the type known as cylindrical, in which there is therefore only a single radius of curvature in the horizontal plane. The development of automobile body shapes, however, is leading to a need for panes having a double curvature, that is to say with a secondary curvature in a direction substantially perpendicular to the direction of the principal curvature, which for example allows continuity to be achieved between the roof of the vehicle and its windscreen. This secondary curvature becomes all the more difficult to achieve as the bend becomes more marked—and therefore the smaller the radius of curvature becomes—and/or the nearer it is situated to the edge of the pane. In such oases, it is necessary to provide additional heating for the pane in these zones of high curvature without increasing the curvature of the central part of the pane, which adopts a spherical deformation. Although it may be possible, if really necessary, to produce panes of this type with the methods of the state of the art, notably by subdividing the electrical resistors of the edge zones of the installation, it is virtually impossible to obtain panes of the type known as "S", that is to say possessing, in addition to their principal curvature, two secondary radii of curvature in opposite directions. Such "S"-shaped panes are suitable for the construction of an automobile in which the windscreen is tangential to both the hood (bonnet) and the roof.

SUMMARY OF THE INVENTION

An object of the present invention is to overcome the disadvantages listed above by the provision of an installation which makes possible improved control of double curvature, including those cases where the radius of curvature is not constant throughout the length or the width of the pane, or where it even reverses.

This object is achieved according to the present invention by a furnace for the curving of glass sheets by settlement or sinking of the sheet onto a curving frame. The furnace comprises at least one heating station, the walls of which are equipped with resistors, and in which the series of resistors associated with the upper part of the heating station is subdivided into one or more axial zones, in which the resistors are orientated parallel to the height of the glass sheets, and into one or more transverse zones, in which the resistors are orientated perpendicularly to the height of the glass sheets, the heating power associated with a given axial or transverse zone being regulated independently of the heating powers associated with the other axial and transverse zones.

The term electrical resistor is to be understood in the context of the present invention notably as denoting resistor tubes of refractory ceramic, around which electrically conducting wires are wound, hollow quartz tubes enclosing heating filaments, small heating elements, preferably square in shape, and capable of being assembled in chess-board pattern, or any other equivalent means known to the person skilled in the art, the only critical point being that these means must have a preferential longitudinal orientation so that these means or these groups of means are analogous to a resistor tube from the aspect of the surfaces heated.

With such an arrangement of the resistor tubes, it is possible to achieve different heating configurations, especially well adapted to the temperature profile which it is desired to impart to the glass sheet, and to achieve this with high accuracy of localization. In one preferred form of embodiment of the invention, the transverse zones are opposite the central part of the glass sheets, and the glass sheets are displaced through the various heating stations along a direction parallel to their height. Thus the upper surface of the glass sheets is subjected to heating elements essentially parallel to its edges.

The accuracy of the heating profile is all the more simple to achieve for a greater number of heating elements. It is, for example, especially advantageous to provide the heating elements of each transverse zone at a pitch of less than 150 mm or better still less than 100 mm, and to cover the length of the central part of the pane not with a single resistor tube but with two or three resistor tubes placed end-to-end and supplied in an independent manner with electrical power.

That which is true for the central part of the pane—where it is desired to achieve a very pronounced curvature, for example along the upper edge tangential to the roof of the automobile—is true also for the lateral parts of the pane, more particularly heated by the axial zones. Thus it is advantageous to operate with four or six axial zones, associated with each of the two lateral parts of the pane.

In a preferred manner, each heating zone, whether axial or transverse, is made up of an assembly of, for example two, resistor tubes carried by common cradles. The position of each cradle may be adjusted in height in such a way as to modify the distance between the glass sheet and the resistors.

Advantageously, the vertical travel of the cradle may be controlled in such a manner as to vary as desired the distance between the axis of a resistor tube and the glass sheet between 100 and 300 mm and, preferably, between 100 and 250 mm, the adjustment being carried out from outside the furnace by manual or automatic controls. Rapid controls allow the cradles to be lowered during the course of the process itself, which makes it possible, if necessary, to keep the distance between the glass sheet and a given resistor constant, even while the glass sheet is settling down onto its curving skeleton.

A furnace according to this invention may comprise one or more heating sections, of which the upper wall is equipped with axial and transverse heating zones. It is not necessary, however, for all the heating sections to be of the same pattern and in installations of large capacity it will be possible to associate, with the heating sections according to this invention, auxiliary heating sections in which all the resistor tubes of the upper part are oriented parallel to the height of the glass sheets. These auxiliary heating sections are preferably in the first or upstream part of the furnace, that is to say in the part of the furnace intended more especially for the preheating of the glass sheet and in which the temperature of the glass is relatively lower. But leaving out the strictly financial aspect (the capital investment associated with a heating section clearly depends upon the number of independently supplied heating zones), this form of embodiment is quite especially advantageous since it produces the maximum optical quality to the extent that it minimizes the risk of generating parallel strips corresponding to the imprint of the resistor tubes and which could interfere with the driver of the vehicle.

The furnace according to this invention is especially suitable to the production of panes having a double curvature, that is to say having a secondary curvature in a plane perpendicular to the plane of the principal curvature. By associating with the pane, if desired, a curving skeleton composed of a frame open at its center but having a convex solid portion, the furnace according to the invention also makes possible the production, under industrial conditions of manufacture, of panes having a secondary "S"-shaped curvature and with points of inflexion that are not centered.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a schematic view from above of a furnace section according to this invention;

FIGS. 3a and 3b are examples of a heating table (FIG. 3b) leading to a pane having an off-center secondary curvature (FIG. 3a);

FIG. 4 is a schematic perspective view of a curving skeleton with a solid part adapted more specifically to the production of "S"-shapes.

DETAILED DESCRIPTION OF THE PREFERRED EMBODIMENTS

Figure 2:
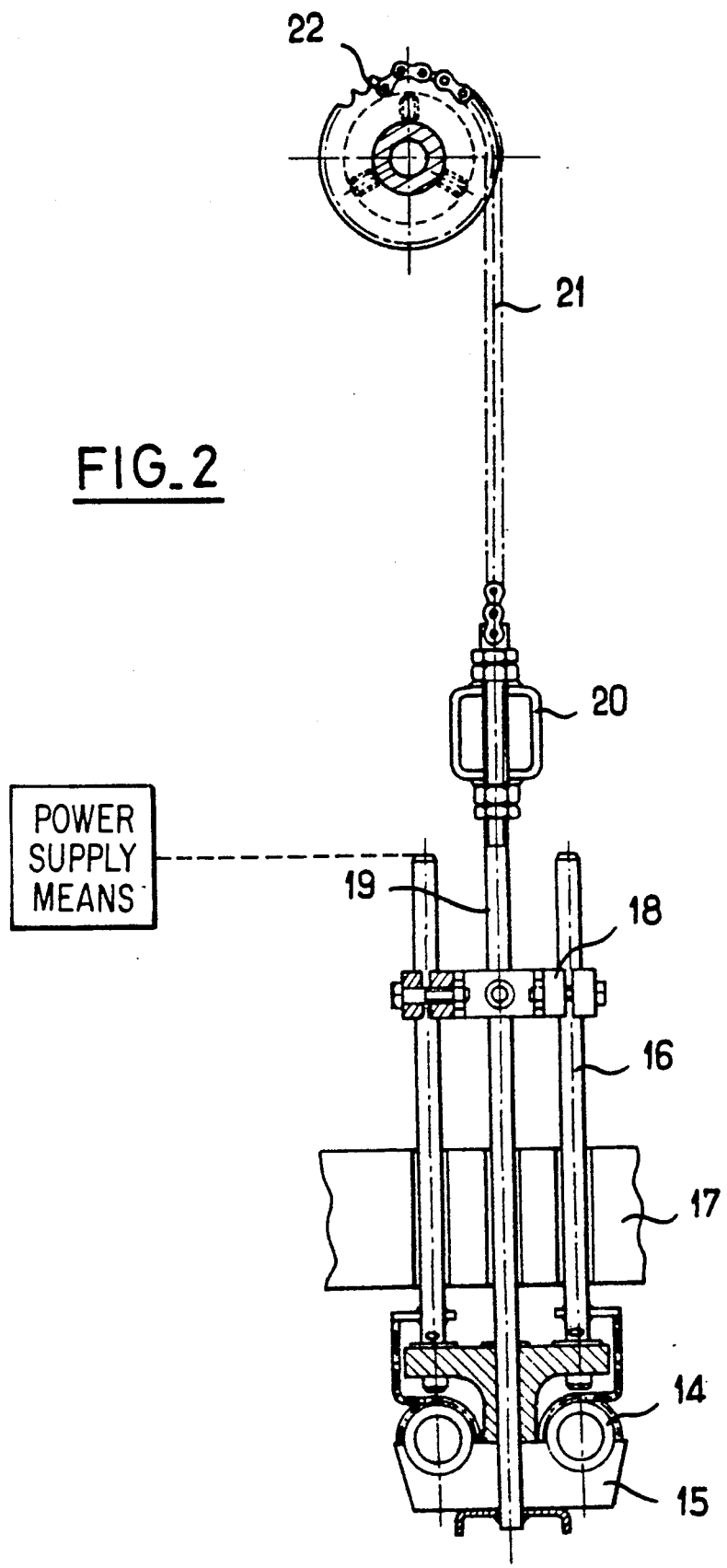
FIG. 2 is a detailed view of a cradle for supporting resistor tubes and of its height adjustment device.

FIG. 1 is a schematic view from above of a furnace intended more especially for the production of glass sheets curved in pairs for the purpose of joining them together with a sheet of plastics material for the manufacture, for instance, of an automobile windscreen.

The furnace shown schematically here comprises only a single heating section (single-cell furnace) but it is evident that identical sections or sections of the auxiliary heating type may be associated together to increase the capacity of the installation.

The furnace is composed of a cell 1, equipped with an opening gate 2, which communicates with a cooling lock chamber 3. In this cell 1, the glass sheets 4 indicated by broken lines and previously cut out and shaped, are placed on a curving mold 6 composed, for example, of a frame open at its center, the profile of which corresponds to the profile which it is desired to give to the glass sheets. This curving mold 6 is carried by a carriage 70, moving on rails parallel to the axis 5 and not illustrated here. When the glass sheets are heated sufficiently, they deform under their own weight and gradually hug the profile of the curving mold.

The heating elements of the cell are composed of tubes of refractory ceramic material, for example tubes of silica or of alumino-silicates, around which metal wires are wound. These resistors are fitted to the hearth of the furnace, where they are mounted parallel to the axis 5 of the furnace. For the hearth it is possible to use, for instance, tubes of approximately 1 meter length mounted fixed and having their ends not projecting outside the furnace. Preferably, the resistors of the furnace hearth are subdivided by zones, for example 6 in number, each zone being supplied with electrical power independently of the other zones. The walls of the furnace parallel to the axis 5 are preferably also equipped with resistor tubes mounted fixed. All these arrangements are well known in the art and do not require any particular comment.

In contrast, the invention proposes a new arrangement of the resistor tubes which are fitted to the furnace vault—and through which approximately 75% of the total heating power of the cell is supplied. The cell shown schematically here has, in effect, 6 lateral heating zones numbered 7 to 12, formed of resistors mounted on cradles suspended from the vault and disposed parallel to the axis 5 of the furnace (i.e., parallel to the direction of movement), and for this reason termed axial heating zones. Two zones symmetrical about the axis of the furnace (for example zones 7 and 12) generally supply identical heating power outputs, but nevertheless are equipped with independent electrical supply means. The same is true for heating zones along one side of the axis, it being possible for each one of the 6 zones to be independently adjusted in power from 0 to 100%.

The cell also possesses a central zone 13, which in the sense of the present invention is a transverse zone facing the central part of the glass sheets. This transverse zone comprises, in the case shown here, 3×18 resistor tubes mounted transversely and defining, together, 3 longitudinal sub-zones, each also independently supplied.

All the resistor tubes associated with the vault are supported on cradles suspended from the vault in adjustable manner, so that it is possible to vary as desired the geometrical heating profile and to adapt it in an optimum manner to the dimensions of the glass sheets treated and to the type of curvature which it is desired to give them. In the case indicated here, a differentiated heating is obtained, for example, of the lateral parts of the glass sheets, which allows them to be curved to a different radius of curvature from that of the other parts—this being achieved without any defect in curvature in these other parts resulting from an increased dwell time in the curving cell.

A device for regulating the height of the position of the resistor tubes is shown schematically in FIG. 2, where it will be seen that the resistor tubes 14, preferably hollow tubes of alumino-silicate, are placed in pairs at their ends on cradles 15. The electrical wires wound around the tubes 14 are connected to an electrical supply via insulated pipes 16 passing through the furnace vault 17 and fixed by attachments 18 to a bar 19, which also supports the cradles 15. Onto the upper end of the bar 19, an attachment 20 is screwed on, to which a chain 21 engaging sprocket wheel 22 is attached. To lower the cradle, it is therefore only necessary to rotate the wheel 22, for example through a third of a revolution, and to stop its movement when the resistors 14 are in place. The rotation of the wheel 22 may be carried out manually or preferably by an automatic device, controlled from the control panel for the furnace. In this manner it is easy to vary the distance between the glass sheet and the resistor tubes, the chain being designed for a lowering of, for example, 200 or 250 mm. In the case of very pronounced curvature, it is also possible to cause the resistor tubes to descend during the curving process.

The advantage of the furnace according to this invention may be seen, for example, from an examination of the results of FIG. 3. The problem posed here was that of creating a pane having a curvature that is off-center with respect to the height of the windscreen, in conformity with the curvature of FIG. 3a, where the values of the double curvature are indicated in millimeters plotted against the distance along the height of the windscreen (in centimeters) or, in other words, the value of the deflection (from the straight line) in the secondary direction of curvature as illustrated by the sketch of a pane also shown in this FIG. 3a. This pane has been produced in a furnace according to this invention comprising a curving station having 3×18 transverse resistor zones, opposite the central part of the pane 23, the position of which in the furnace has been shown, and having 6×7 axial resistor zones opposite the lateral parts. All the heat supply is provided through the resistors of the upper part. During a first period (480 seconds), the pane is preheated up to a temperature close to the deformation temperature of the glass, by regulating all the zones in an identical manner (set-point temperature 400° C.). During a second period (360 seconds), the values of the set point temperatures are all varied by following the heating table shown in FIG. 3b. The very large number of resistors available and their positioning essentially parallel to the height of the panes in the zones of most pronounced curvature makes possible a very fine adjustment of the temperature profile of the glass sheets, which leads to high accuracy in the production of the curvature desired.

It is also possible to obtain "S"-shaped curvatures, that is to say panes having at least one point of inflexion, in the direction of their height. In this case it is necessary to create a very marked temperature difference between points on the surface of the glass sheets which are, however, very near together (the "hump" must, in fact, be given additional heating without such additional heating being provided, however, to the immediately adjacent part of the pane which must, for example, be relatively straight and not very hollowed). This hollowing is avoided if a curving skeleton such as that shown schematically in FIG. 4 is used. This skeleton is composed of a metal frame 24, articulated about two axes 25 and 26, in such a way as to cause the glass sheet to continuously rest on the skeleton right from the commencement of shaping, the lateral parts 27 and 28 of the frame being raised during the course of the process. The frame 24 is reinforced by stiffening elements 29 which never come into contact with the glass sheet. According to the invention, the frame also comprises a solid part 30, which allows the desired convex curvature to be obtained. Advantageously, the part of the glass sheet bearing against this solid part 30 of the frame 24 is heated essentially by the resistor zones resistor zones situated at the side of, and not opposite, the glass sheet, so that the central part of this sheet is not overheated by radiation.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for curving glass sheets mounted on curving molds, comprising:
   a furnace having at least one heating section;
   means for carrying a curving mold through the heating section in a direction parallel to the height of the glass sheets;
   a curving mold carried by said carrying means through the at least one heating section;
   a plurality of heating elements mounted in said at least one heating section, including a plurality of heating elements positioned above said curving mold and comprising:
   a) a plurality of heating elements forming a plurality of axial heating zones and extending in the direction of the height of the glass sheets, and
   b) another plurality of heating elements forming a central transverse heating zone positioned between said axial heating zones and extending transverse to the height of the glass sheets; and
   means for independently supplying heating power to the heating elements of each of said heating zones.

2. The apparatus according to claim 1 wherein said carrying means carries the curving mold in a direction of an axis of said furnace, wherein said plurality of axial zones comprises at least two axial zones located at opposite sides of the axis.

3. The apparatus according to claim 2, wherein said heating elements each comprise a resistor tube of refractory ceramic material, around which electrically conducting wires are wound.

4. The apparatus according to claim 2, wherein said heating elements each have a longitudinal orientation.

5. The apparatus according to claim 2, wherein the heating elements of said transverse heating zone comprises a plurality of heating elements at a pitch of less than 150 mm as viewed in the direction parallel to the height of the glass sheet.

6. The apparatus according to claim 2 wherein said plurality of axial zones includes at least four of said axial zones, as viewed in a direction parallel to the height of the glass sheets.

7. The apparatus according to claim 2, wherein the curving mold is shaped to give the glass sheets a double curvature.

8. The apparatus according to claim 7, wherein the curving mold comprises a solid part having a central opening, whereby the glass sheets are given an "S" shape.

9. The apparatus according to claim 1, wherein each of said zones is composed of an assembly of two resistor tubes supported by a common cradle.

10. The apparatus according to claim 9, wherein said cradles are mounted on height adjustable means, the distance between selected resistor tubes and a glass sheet on a curving mold carried through the heating section being independently adjustable between 100 and 300 mm.

* * * * *